United States Patent
Yamamoto

(10) Patent No.: US 8,025,965 B2
(45) Date of Patent: Sep. 27, 2011

(54) PAINT FOR HIGHLY CORROSION-RESISTANT ZINC-ALLOY COATED STEELS AND STEEL STRUCTURE HAVING COATED FILM OF SAID PAINT

(75) Inventor: Masahiro Yamamoto, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 83 days.

(21) Appl. No.: 11/578,768

(22) PCT Filed: Apr. 25, 2005

(86) PCT No.: PCT/JP2005/008330
§ 371 (c)(1),
(2), (4) Date: Oct. 17, 2006

(87) PCT Pub. No.: WO2005/105934
PCT Pub. Date: Nov. 10, 2005

(65) Prior Publication Data
US 2007/0209555 A1 Sep. 13, 2007

(30) Foreign Application Priority Data
Apr. 28, 2004 (JP) .................. 2004-132315

(51) Int. Cl.
B32B 5/16 (2006.01)
(52) U.S. Cl. ...................................... 428/323
(58) Field of Classification Search ............... 106/14.14; 428/323
See application file for complete search history.

(56) References Cited

U.S. PATENT DOCUMENTS
4,606,800 A * 8/1986 Hart et al. .................... 204/488

FOREIGN PATENT DOCUMENTS

| | | |
|---|---|---|
| JP | 59074172 A | 4/1984 |
| JP | 60149788 A | 8/1985 |
| JP | 10306357 A | 11/1998 |
| JP | 11-240947 | 8/1999 |
| JP | 11343422 A | 12/1999 |
| JP | 2001-064759 | 3/2001 |
| JP | 200159185 | 3/2001 |
| JP | 2001164194 A * | 6/2001 |
| JP | 2001170558 | 6/2001 |
| JP | 2001234315 | 8/2001 |
| JP | 2003170530 A | 6/2003 |
| WO | WO 2004026508 A2 * | 4/2004 |

OTHER PUBLICATIONS

Ullmann's Encyclopedia of Industrial Chemistry—Inorganic Pigments article, Wiley, Dec. 15, 2006, Section 4.2, pp. 130-150.*
Kalendova et al., Possibilities of Affecting the Corrosion-Inhibition Efficiency of the Coatings by Means of the Zinc Powder Particle Sizes and Shapes, Oct. 7, 2002, Macromolecular Symposia, vol. 187, Issue 1, pp. 377-386.*

* cited by examiner

Primary Examiner — Callie E Shosho
Assistant Examiner — Elizabeth Robinson
(74) Attorney, Agent, or Firm — Kenyon & Kenyon LLP

(57) ABSTRACT

A paint for highly corrosion-resistant zinc-alloy coated steels containing zinc-alloy powder at not less than 60 mass %, characterized in that said powder contains aluminum at not less than 10 mass % and less than 30 mass % and the remainder comprising zinc and unavoidable impurities, the shape of powder particles is spherical or oval and the ratio between the maximum and minimum diameters (maximum diameter/minimum diameter) is 1 to 1.5, and a steel structure having coated films produced by using said paint.

2 Claims, 1 Drawing Sheet

PAINT FOR HIGHLY CORROSION-RESISTANT ZINC-ALLOY COATED STEELS AND STEEL STRUCTURE HAVING COATED FILM OF SAID PAINT

TECHNICAL FIELD

The present invention relates to paints to be coated on zinc-alloy coated steels and steel structures having coated films of said paints, and more particularly to anti-corrosive paints to prevent corrosion of uncoated surfaces in cut ends and worked and welded parts of zinc-alloy coated steels and steel structures having coated films of said anti-corrosive paints.

BACKGROUND ART

Generally zinc coating is used in various fields as an anti-corrosive treatment for steel products. Recently, steel plates coated with high corrosion-resistant zinc-alloys, prepared with addition of Al, Mg and other elements to Zn, are also used, as disclosed in Japanese Unexamined Patent Publication (Kokai) No. 11-240947 and No. 10-306357. These coated steel plates are first coated and then converted into final products by applying various working processes. Therefore, they have uncoated parts in, for example, cut ends and welded parts.

In environments with moderate corrosiveness, cut ends and welded parts are not corroded heavily. Meanwhile, steel surfaces coated with zinc-alloys providing greater corrosion-resistance than conventional coatings remain uncorroded for long periods of time, with the result that red rust formed by corrosion of cut ends and welded parts become conspicuous in the course of long use.

Therefore corrosion protection must be provided to such parts. Corrosion protection is provided by spraying or other methods that provide appearance similar to that of metal coating. However, limited application of spraying only to cut ends involves many problems in terms of equipment and cost. Common anti-corrosive paintings are sometimes used. However, ordinary white or red paints spoil the appearance because repaired parts covered with such colors are widely different from the surface covered with zinc-alloy coatings.

Therefore, zinc-rich paints containing zinc powder are often used. Zinc-rich paint coating is a commonly used method specified in the JIS Standards (JIS-K-5553). As with zinc coating, however, use of Mg, Al and other alloy elements, together with zinc powder, will probably provide greater corrosion-resistance.

For example, Japanese Unexamined Patent Publication (Kokai) No. 2001-164 discloses a zinc-rich paint prepared with addition of an alloy powder comprising Mg of 1 to 10%, Al of 2 to 19% and Zn as the remainder. Japanese Unexamined Patent Publication (Kokai) No. 11-343422 discloses an organic rust-preventing paint containing flaky zinc-alloy powder comprising Al of 5 to 10 mass %, Mg of 0.01 to 5 mass % and Zn as the balance.

These technologies featuring the addition of powder of alloy elements are intended for providing corrosion-resistance to the surface of steel products.

SUMMARY OF THE INVENTION

Repairing paints for cut ends and welded parts of zinc-alloy coated steels are required to have not only an effect to protect the surface of steel from corrosion but also corrosion-resistance and coating adhesion to zinc-alloy coated surfaces.

Many of conventional repairing paints have been prepared with priority given to corrosion-resistance and adhesion on the surface of steel and, therefore, do not have adequate corrosion-resistance and adhesion on coated surfaces.

Besides conventional repairing paints that have been prepared without giving consideration to use on zinc-alloy coated surfaces do not have adequate corrosion-resistance and adhesion on surfaces coated with zinc-alloys that have come into increasing use in recent years.

Thus, the object of the present invention is to provide paints for high corrosion-resistant zinc-alloy coatings that have little color difference from zinc-alloy coatings and ensure good adhesion to coated steels while securing the corrosion-resistance of coated steel surfaces and steel structures protected with such paints.

The inventors studied corrosion-resistance at steel surfaces and corrosion-resistance and paint coating adhesion at zinc-alloy coated surfaces by varying the composition and shape of alloy element particles added to zinc-rich paints. Then, the inventors discovered that the composition and shape of alloy element particles have great influence on not only corrosion-resistance at steel surfaces but also corrosion-resistance and paint coating adhesion at zinc-alloy coated surfaces. The gist of the present invention led from the discovery is as follows:

(1) A paint for highly corrosion-resistant zinc-alloy coated steels, containing zinc-alloy powder at not less than 60 mass %, characterized in that said powder contains aluminum at not less than 10 mass % and less than 30 mass % and the remainder comprising zinc and unavoidable impurities, the shape of powder particles is spherical or oval and the ratio between the maximum and minimum diameters (maximum diameter/minimum diameter) is 1 to 1.5.

(2) A paint for highly corrosion-resistant zinc-alloy coated steels, as described in (1), in which the 90% cumulative particle size of said powder is not more than 35 μm.

(3) A paint for highly corrosion-resistant zinc-alloy coated steels, as described in (2), in which the average particle size of said powder is not less than 2 μm.

(4) A paint for highly corrosion-resistant zinc-alloy coated steels, as described in any of (1) to (3), in which said powder contains at least one of magnesium at more than 0 mass % and less than 1 mass % and silicon at not less than 0.1 mass % and not more than 3.0 mass %.

(5) A steel structure covered with a not less than 10 μm thick coating film containing organic resin on at least a part of one or both of steel or zinc-alloy coated surfaces, characterized in that said coating film containing organic resin contains zinc-alloy powder at not less than 60 mass %, said powder contains aluminum at not less than 10 mass % and less than 30 mass % and the remainder comprising zinc and unavoidable impurities, the shape of powder particles is spherical or oval and the ratio between the maximum and minimum diameters (maximum diameter/minimum diameter) is 1 to 1.5.

(6) The steel structure, as described in (5), in which the 90% cumulative particle size of said powder is not more than 35 μm.

(7) The steel structure, as described in (6), in which the average particle size of said powder is not less than 2 μm.

(8) The steel structure, as described in any of (4) to (6), in which said powder contains at least one of magnesium at more than 0 mass % and less than 1 mass % and silicon at not less than 0.1 mass % and not more than 3.0 mass %.

The use of the paints according to the present invention facilitates the repairing of edges and damages parts of high corrosion-resistant zinc-alloy coated steels and makes the corrosion-resistance of the repaired parts comparable to that of zinc-alloy coating. Even when partially applied on top of zinc-alloy coating, the paints exhibit excellent corrosion-resistance and adhesion and harmonize with the color of zinc-alloy coating. Thus, the paints of the present invention maintain beautiful appearance throughout the entirety of steel structures over long periods of time.

THE MOST PREFERRED EMBODIMENT

Figure 1:
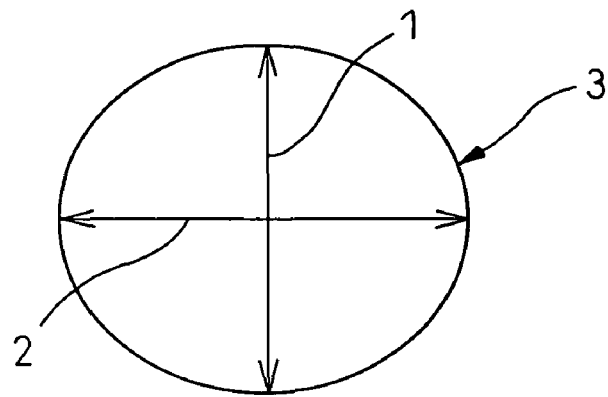
FIG. 1 shows the appearance of powder particle.
Figure 2:
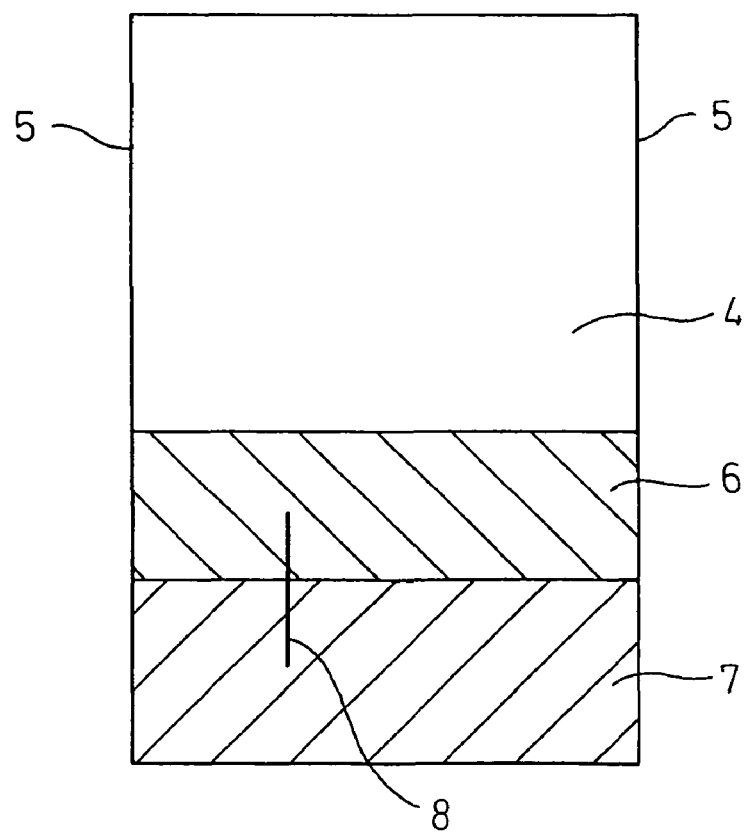
FIG. 2 is a schematic illustration of test specimen.

The paints according to the present invention contain zinc-alloy powder at not less than 60 mass % that contains aluminum at not less than 10 mass % and less than 30 mass %, with the remainder comprising zinc and unavoidable impurities. The shape of powder particles is spherical or oval and the ratio between the maximum and minimum diameters (maximum diameter/minimum diameter) is 1 to 1.5.

The paints of the present invention must contain zinc-alloy powders at not less than 60 mass %. If the content of zinc-alloy powder is less than 60 mass %, the resultant color and corrosion-resistance are not equal to those of zinc-alloy coating. Although the upper limit of the powder content is not particularly specified, it is preferable to keep it not more than 85 mass % because resin content decreases too much and coating defects are likely to occur.

In order to secure adequate film formability, the paints must contain at least resins of 15 mass %. So long as the paints contain powder at not less than 60 mass %, they may contain powders of other substances, such as, for example, Al, Zn, stainless steel and other coloring metals, titanium oxide, zinc oxide and other oxides, and talk, chalk and other body pigments.

Said powder of zinc-alloys must contain aluminum at not less than 10 mass % and less than 30 mass %, with the remainder comprising zinc and unavoidable impurities. If the aluminum content in the zinc-alloy powder is less than 10%, zinc in the zinc-alloy powder solves out so fast that steel surfaces do not remain corrosion-resistant over long periods of time. If the aluminum content is 30% or more, the electrochemical protective potential approaches that of steel, with the result that corrosion protection effect on steel surfaces diminishes, red rust becomes apt to develop, and, therefore, corrosion-resistance drops.

The powder of zinc-alloy must be spherical or oval in shape and the ratio between the maximum and minimum diameters (maximum diameter/minimum diameter) between 1 and 1.5. This means that the surface area or surface area per volume (specific surface area) of the metal powder is closely associated with the performance of the coating. Metal powders having smaller specific area are less prone to elution and enhance coating adhesion on alloy coatings.

Therefore, the shape of metal powder particles must be spherical or oval. As oval shaped particles closer to spherical provide greater coating adhesion, the ratio between the maximum and minimum diameters (maximum diameter/minimum diameter) is limited to between 1 and 1.5. When the ratio is 1, the shape is spherical.

The above specification is for metal powders to be used as material. Therefore, the above specification does not limit the shape of zinc-alloy powder particles that have coagulated and combined by absorbing the moisture in the air before being mixed with the paint and put to use or that have combined and hardened as coated films on metal-coated steels.

Small pits and projections are sometimes formed on the surface of zinc-alloy powder particles in the course of manufacture or storage. However, powder particles with such shape changes do not depart from the range of spherical and oval shapes.

Although the method for preparing the metal powder according to the present invention is not particularly limited, atomization and pulverization are commonly used. While spherical or oval power particles are readily manufactured by atomization, the shape of powder particles manufactured by pulverization is apt to depart from spherical or oval. Therefore, atomization is more suited for the manufacture of powder particles of appropriate shape.

Although the resin composition of the paints according to the present invention is not particularly specified, resins having excellent resistance to water and alkali, such as epoxy, modified epoxy, acrylic, urethane and polyester resins.

Either one-pack or two-pack curing agents can be used depending on purposes. Curing method can be chosen from among, for example, room-temperature, heating, ultraviolet and electron radiation curing depending on purposes.

The 90% cumulative particle size ($d_{90}$) of the zinc-alloy powder according to the present invention should preferably be not larger than 35 μm. The reason why $d_{90}$ of zinc-alloy powder is limited to not larger than 35 μm is that powder of larger particle size provides better corrosion-resistance.

If $d_{90}$ exceeds 35 μm, that is to say, the coated film is interspersed with large particles that deteriorate the mechanical properties of the coated films themselves, are apt to form crevices and cracks in the film, and, as a result, give rise to elution of zinc-alloy powder and deteriorate the adhesion of the coated film.

The 90% cumulative particle size ($d_{90}$) is the particle size of 90% of all particles integrated, from small particles, over the particle size distribution determined by the light-scattering method. Other methods may be used in place of the light-scattering method so long as the 90% cumulative particle size ($d_{90}$) is obtainable by conversion.

It is further preferable that the average particle size of said powder is not less than 2 μm. The average particle size smaller than 2 μm means the presence of many extremely small particles in the powder. When the paint containing such powder is kneaded, reaction between the particles and resin proceeds to such a level that the viscosity of the paint increases so much as to make the application thereof difficult. The result is the forming of coated films with many pinholes and other defects and poor corrosion-resistance.

The average particle size is obtained by integrating the particle sizes based on the 50% cumulative distribution determined by the light-scattering method. Other methods may be used in place of the light-scattering method so long as the cumulative particle size is obtainable by conversion. If the average particle size is larger than 2 µm, the coated film interspersed with large particles tends to give rise to problems.

It is also preferable that said zinc-alloy powder contains at least one of magnesium at more than 0 mass % and less than 1 mass % and silicon at not less than 0.1 mass % and not more than 3.0 mass %.

The composition of the zinc-alloy powder may be chosen depending on the type of the film of the zinc-alloy coating on steel. When the coating contains magnesium, it is preferable to use metal powder containing magnesium.

If the zinc-alloy powder contains magnesium at not less than 1 mass %, the powder is apt to solve out in corrosive environments, with the result that the paint adhesion on the zinc-alloy coated surface deteriorates so badly that the probability of blistering and peeling increases.

Furthermore, addition of silicon at not less than 0.1 mass % produces the effect to improve the corrosion-resistance of the paint film on the surface of steel. Although further addition enhances the effect, addition of silicon of 3.0 mass % or more weakens the effect of corrosion-resistance improvement. The practically preferable addition is not more than 1.0 mass % because manufacture of metal particles becomes difficult beyond that limit.

The zinc-alloy coated steels to which the paints according to the present invention are applied are not particularly specified. The steels may be electrogalvanized by adding iron, nickel or other alloy elements to the electrogalvanizing according to JIS-H-8610 or hot-dip galvanized by adding aluminum, magnesium or other alloy elements to the hot-dip galvanizing according to JIS-H-8642. The range of alloy composition and manufacturing conditions are not limited.

While adequate performance is obtainable by applying the paints according to the present invention directly on said alloy coatings, application of chromating or other chemical treatments increases the adhesion of the paints.

The paints that provide excellent corrosion-resistance to the cut ends and worked parts also will show excellent corrosion-resistance on the surface of steels. Thus, the paints according to the present invention exhibit excellent performance on uncoated steels.

The present invention also provides steel structures covered with a not less than 10 µm thick coating film containing organic resin on at least a part of one or both of steel or zinc-alloy coated surfaces, in which said coating film containing organic resin contains zinc-alloy powder at not less than 60 mass %, said powder contains aluminum at not less than 10 mass % and less than 30 mass % and the remainder comprising zinc and unavoidable impurities, the shape of powder particles is spherical or oval and the ratio between the maximum and minimum diameters (maximum diameter/minimum diameter) is 1 to 1.5.

It is preferable that the entirety of steel surfaces is coated.

The steel structures include, for example, columnar structures and beams such as power poles and H sections for buildings and connecting hardware therefor, roofs, walls, floors and other structures made of sheet piles and corrugated steel plates and connecting hardware therefor, flat structures such as net fences and windbreak fencing made of wires and expanded metal and connecting hardware therefor, water and gas piping and connection hardware therefor. The steel structures also include other types than those mentioned above so long as zinc-alloy coating is applicable.

The particle size and composition of the zinc-alloy powders contained in the organic resin coatings on the steel structures are the same as those in the paints according to the present invention.

EXAMPLES

The prevent invention is described below by reference to examples.

Example 1

Table 1 shows details of the test specimens 5 used in the experiment. The steels used were 3.2 mm thick SS400 steel to which zinc coating was applied in the laboratory. The steels not marked "electrogalvanized" were prepared by hot-dip galvanizing. The zinc-coated test specimens were cut to 150 mm by 75 mm and part of the zinc-coated surface 6 was ground with a grinder. The steel surface 7 thus exposed were painted together with the zinc-coated and cut surfaces.

A part 4 of the steel surface was left un-zinc-coated. A scratch 8 was produced in the zinc-coated part by a cutter knife.

The paints were all applied by air spraying, to a target thickness of 50 µm. The paints were prepared by mixing the metal powder shown in Table 1 with the base of amine curing type epoxy resin.

The metal powders were suspended in the embedded epoxy resin and the cross section of particles was observed by an optical microscope after grinding. In Table 1, the spherical particle means the particle whose maximum diameter 2 and the minimum diameter 1 of the cross section of the particle 3 observed by the optical microscope are substantially equal as shown in FIG. 1. The oval particle means the smoothly shaped particle having obviously different maximum and minimum diameters. The massive particle means the particle that has conspicuous projections in the cross section and does not look spherical or oval.

The ratio between the maximum and minimum diameters was obtained by measuring the maximum and minimum diameters of typical ten particles selected from the individual powders. The particle size distribution is the one determined by the light-scattering method.

Corrosion test was conducted for three months by the alternate dry and wet test according to JIS-H-8502, and the corroded condition of the cut surface in the painted region, coated surface and steel surface were evaluated. The coated and steel surfaces were evaluated by evaluating the blistering from the scratch and the blistering in the flat part was also included in the evaluation.

The edges were evaluated as follows: entirely red-rusted, Δ: with red rust observed, ○: with white rust and without red rust, and ⊚: with no red and white rust.

The coated and steel surfaces were evaluated as follows: x: with peeling from the scratch not less than 10 mm in width and surface blistering not less than 3 mm, Δ: with peeling from the scratch between 5 and 10 mm in width and surface blistering less than 3 mm, ○: with peeling from the scratch less than 5 mm, with white flow rust and without blistering in the flat part, and ⊚: with peeling from the scratch less than 5 mm in width, with slight white rust and without blistering in the flat part.

Integrated evaluation was made by combining the individual evaluations. The evaluation ○~Δ means that the condition is better than Δ but somewhat poorer than ○ and the evaluation Δ~x also has a similar meaning.

TABLE 1

| No | Base Zinc-alloy Coating | Powder Composition (Mass %) Al | Mg | Si | Zn | Shape of Particles | Ratio between Maximum and Minimum Diameters | Particle Size Distribution (μm) $d_{90}$ |
|---|---|---|---|---|---|---|---|---|
| 1 | 5%Al—Zn | 10 | 0.5 | — | Remainder | Spherical | 1.0 | 30 |
| 2 | 11Al—3Mg—0.5Si—Zn | 10 | 0.5 | — | Remainder | Spherical | 1.0 | 30 |
| 3 | 5%Al—Zn | 10 | — | — | Remainder | Spherical | 1.0 | 27 |
| 4 | 11Al—3Mg—0.5Si—Zn | 10 | — | — | Remainder | Spherical | 1.0 | 27 |
| 5 | Electrogalvanizing 3Ni—Zn | 10 | 0.5 | — | Remainder | Spherical | 1.0 | 30 |
| 6 | 11Al—3Mg—0.5Si—Zn | 20 | 0.5 | — | Remainder | Spherical | 1.0 | 33 |
| 7 | 11Al—3Mg—0.5Si—Zn | 28 | 0.5 | — | Remainder | Spherical | 1.0 | 28 |
| 8 | 11Al—3Mg—0.5Si—Zn | 28 | 0.02 | — | Remainder | Spherical | 1.0 | 30 |
| 9 | 11Al—3Mg—0.5Si—Zn | 20 | 0.02 | — | Remainder | Spherical | 1.0 | 29 |
| 10 | 11Al—3Mg—0.5Si—Zn | 10 | 0.02 | — | Remainder | Spherical | 1.0 | 29.5 |
| 11 | 11Al—3Mg—0.5Si—Zn | 10 | 0.02 | — | Remainder | Oval | 1.22 | 27 |
| 12 | 11Al—3Mg—0.5Si—Zn | 10 | 0.02 | — | Remainder | Oval | 1.45 | 26 |
| 13 | 11Al—3Mg—0.5Si—Zn | 20 | 0.005 | — | Remainder | Spherical | 1.0 | 24 |
| 14 | 11Al—3Mg—0.5Si—Zn | 20 | 0.5 | — | Remainder | Oval | 1.15 | 29 |
| 15 | 11Al—3Mg—0.5Si—Zn | 10 | 0.02 | — | Remainder | Spherical | 1.0 | 30 |
| 16 | 11Al—3Mg—0.5Si—Zn | 10 | 0.02 | — | Remainder | Spherical | 1.0 | 29.5 |
| 17 | 11Al—3Mg—0.5Si—Zn | 10 | 0.02 | — | Remainder | Spherical | 1.0 | 29.5 |
| 18 | 11Al—3Mg—0.5Si—Zn | 10 | 0.02 | 0.1 | Remainder | Spherical | 1.0 | 29.5 |
| 19 | 11Al—3Mg—0.5Si—Zn | 10 | 0.02 | 0.5 | Remainder | Spherical | 1.0 | 29.5 |
| 20 | 11Al—3Mg—0.5Si—Zn | 15 | 0.02 | — | Remainder | Spherical | 1.0 | 29 |
| 21 | 11Al—3Mg—0.5Si—Zn | 10 | 3.0 | — | Remainder | Spherical | 1.0 | 24 |
| 22 | 11Al—3Mg—0.5Si—Zn | 10 | 0.02 | — | Remainder | Spherical | 1.0 | 56 |
| 23 | 11Al—3Mg—0.5Si—Zn | 10 | 0.02 | — | Remainder | Spherical | 1.0 | 13 |
| 24 | 11Al—3Mg—0.5Si—Zn | 10 | 0.02 | — | Remainder | Massive | 1.33 | 29 |
| 25 | 11Al—3Mg—0.5Si—Zn | 28 | 0.02 | 1.2 | Remainder | Spherical | 1.0 | 28 |
| 26 | 11Al—3Mg—0.5Si—Zn | — | — | — | Remainder | Spherical | 1.0 | 25 |
| 27 | 11Al—3Mg—0.5Si—Zn | 10 | 0.02 | — | Remainder | Massive | 1.68 | 28 |
| 28 | 11Al—3Mg—0.5Si—Zn | 10 | 0.02 | — | Remainder | Acicular | 5> | Unmeasurable |
| 29 | 11Al—3Mg—0.5Si—Zn | 10 | 0.02 | — | Remainder | Oval | 2.15 | 29.5 |
| 30 | 11Al—3Mg—0.5Si—Zn | 10 | 0.02 | — | Remainder | Massive | 1.68 | 20 |
| 31 | 11Al—3Mg—0.5Si—Zn | 35 | — | — | Remainder | Spherical | 1.0 | 23.5 |
| 32 | 11Al—3Mg—0.5Si—Zn | 55 | — | — | Remainder | Spherical | 1.0 | 25.5 |
| 33 | 11Al—3Mg—0.5Si—Zn | — | — | — | 100 | Spherical | 1.0 | 21 |
| 34 | Zinc coating | — | — | — | 100 | Spherical | 1.0 | 21 |
| 35 | 11Al—3Mg—0.5Si—Zn | 100 | — | — | — | Massive | 1.33 | 27.2 |

| No | Particle Size Distribution (μm) average | Other Paint Component | Blending Ratio of Powder (Mass %) | Appearance of Cut Surface | Appearance of Coated Surface | Appearance of Ground Surface | Integrated Evaluation | Remarks |
|---|---|---|---|---|---|---|---|---|
| 1 | 18.5 | Resin | 80 | ⊚ | ○ | ⊚ | ⊚ | Examples of the Present Invention |
| 2 | 18.5 | Resin | 80 | ⊚ | ○ | ⊚ | ⊚ | |
| 3 | 17.3 | Resin | 80 | ⊚ | ○ | ⊚ | ⊚ | |
| 4 | 17.3 | Resin | 80 | ○ | ○ | ⊚ | ○ | |
| 5 | 18.5 | Resin | 80 | ○ | ○ | ⊚ | ○ | |
| 6 | 21.0 | Resin | 75 | ○ | ○ | ⊚ | ⊚ | |
| 7 | 17.5 | Resin | 70 | ○ | ○ | ⊚ | ⊚ | |
| 8 | 16.5 | Resin | 70 | ○ | ○ | ⊚ | ⊚ | |
| 9 | 18.5 | Resin | 70 | ○ | ○ | ⊚ | ⊚ | |
| 10 | 17.8 | Resin | 80 | ⊚ | ⊚ | ⊚ | ⊚ | |
| 11 | 13.3 | Resin | 80 | ⊚ | ○ | ⊚ | ⊚ | |
| 12 | 12.7 | Resin | 80 | ⊚ | ○ | ⊚ | ⊚ | |
| 13 | 12.8 | Resin | 70 | ⊚ | ⊚ | ⊚ | ⊚ | |
| 14 | 14.5 | Resin | 70 | ⊚ | ○ | ⊚ | ⊚ | |
| 15 | 17.8 | Resin | 80 | ⊚ | ⊚ | ⊚ | ⊚ | |
| 16 | 17.8 | Resin | 60 | ○ | ○ | ○ | ○ | |
| 17 | 17.8 | Resin | 70 | ○ | ⊚ | ⊚ | ○ | |
| 18 | 17.8 | Resin | 80 | ⊚ | ⊚ | ⊚ | ⊚ | |

TABLE 1-continued

| | | | | | | | | |
|---|---|---|---|---|---|---|---|---|
| 19 | 17.8 | Resin | 80 | ◎ | ◎ | ◎ | ◎ | |
| 20 | 15 | Resin | 75 | ○ | Δ | ○ | ○-Δ | |
| 21 | 11.5 | Resin | 80 | ○ | Δ | ○ | ○-Δ | |
| 22 | 26.5 | Resin | 80 | Δ | ○ | Δ | ○-Δ | |
| 23 | 1.78 | Resin | 80 | Δ | ○ | Δ | ○-Δ | |
| 24 | 12.5 | Resin | 80 | Δ | Δ | ○ | ○-Δ | |
| 25 | 15 | Resin | 70 | Δ | ○ | Δ | ○-Δ | |
| 26 | 18 | Resin | 80 | ○ | Δ | Δ | ○-Δ | |
| 27 | 18 | Resin | 80 | Δ | X | ○ | Δ | Examples |
| 28 | Unmeasurable | Resin | 80 | X | X | X | X | for |
| 29 | 17.8 | Resin | 80 | Δ | X | Δ | Δ | Comparison |
| 30 | 18 | Resin | 80 | Δ | X | Δ | Δ | |
| 31 | 12.5 | Resin | 70 | ○ | X | Δ | Δ | |
| 32 | 14.3 | Resin | 60 | ○ | X | Δ | Δ | |
| 33 | 13 | Resin | 80 | Δ | X | Δ | Δ-X | |
| 34 | 13 | Resin | 80 | Δ | X | Δ | Δ-X | |
| 35 | 14.5 | Resin | 40 | Δ | X | X | X | |

The integral evaluation results for all of the examples of the present invention were ○~Δ or higher. The samples whose particle size distribution $d_{90}$ is not less than 35 μm, average particle size is not less than 2 μm and those prepared by adding magnesium at less than 1 mass % or silicon at not less than 0.1 mass % and not more than 1.0 mass % proved excellent in integrated evaluation.

The painted test specimen No. 19 was embedded in resin and the cross section was observed by electron probe micro analysis. Then it became obvious that particles were evenly distributed in the coated film and the added elements were present in such particles. Uniform distribution of the added elements in the organic resin phase on steel surfaces proved to provide excellent corrosion-resistance.

Example 2

Room-temperature curing paints were prepared by mixing one or more zinc-alloy powders selected from among Nos. 4, 7, 33 and 35 in Table 1 were mixed with one-pack acrylic resin paint. Table 2 shows the blending ratios of the individual paints. The remainder is resin. The paints were applied on half of the steel sheets coated with 11Al-3Mg-0.5Si—Zn and the obtained colors were evaluated.

Colors were evaluated by the average of the results of five-score sensory test conducted by five people (5 means agreement and 1 means great deviation). Also, salt spray test (SST) was conducted for three months on the same test specimens and the blistering in the flat part of the coated surface was evaluated by five scores (5 is excellent).

Table 2 shows the obtained results. As can be seen, the examples of the present invention provided good color agreement and excellent corrosion-resistance and adhesion on the coated surface.

Example 3

Room-temperature curing paints were prepared by mixing powders corresponding to Nos. 37 and 45 in Table 2 with acrylic resin paint. The rusted part of the roof made of corrugated steel sheet coated with 55% aluminum-zinc alloy that has been in use for approximately ten years was ground by a grinder. The paints were applied by a roller over the entire area of the ground part. The paint No. 37 according to the present invention exhibited excellent appearance in both coated and grounded surfaces, without showing any change over a period of nine months and thereby proving the effectiveness of the present invention.

By contrast, the paint No. 45 tested for comparison was obviously different from the original color and the painted part was clearly different from the coated part after nine months. This also proved the effectiveness of the present invention.

INDUSTRIAL APPLICABILITY

As described above, the use of the paints according to the present invention permits maintaining beautiful appearance over the entirety of steel structures over long periods of time. Therefore, the present invention has great industrial applicability.

TABLE 2

| No | Particle 1 | Blending Ratio (Mass %) | Particle 2 | Blending Ratio (Mass %) | Particle 3 | Blending Ratio (Mass %) | Color Evaluation | SST Evaluation | Remarks |
|---|---|---|---|---|---|---|---|---|---|
| 36 | 4 | 60 | 35 | 20 | — | — | 4.8 | 5 | Examples |
| 37 | 4 | 60 | 35 | 10 | 33 | 10 | 4.6 | 5 | of the |
| 38 | 4 | 60 | 35 | 20 | — | — | 4.2 | 5 | Present |
| 39 | 7 | 60 | 35 | 20 | — | — | 4.0 | 5 | Invention |
| 40 | 7 | 60 | 35 | 20 | — | — | 4.4 | 5 | |
| 41 | 7 | 60 | 35 | 20 | 33 | 10 | 4.2 | 5 | |
| 42 | 33 | 80 | — | — | — | — | 2.6 | 3 | Examples |
| 43 | 35 | 40 | — | — | — | — | 3.4 | 3 | for |
| 44 | 4 | 50 | 35 | 30 | — | — | 4.0 | 2 | Comparison |
| 45 | 7 | 40 | 35 | 20 | 35 | 20 | 4.2 | 2 | |

The invention claimed is:

1. A paint for highly corrosion-resistant zinc-alloy coated steels, containing atomized zinc-alloy powder at not less than 60 mass %, characterized in that said powder contains aluminum at not less than 10 mass % and less than 30 mass %, at least one of magnesium at more than 0 mass % and less than 1 mass % and silicon at not less than 0.1 mass % and not more than 3.0% mass %, and the remainder comprising zinc and unavoidable impurities, wherein the atomized zinc-alloy powder has a 90% cumulative particle size not more than 35 μm and an average particle size of not less than 2 μm, and the shape of powder particles is spherical or oval and the ratio between the maximum and minimum diameters (maximum diameter/minimum diameter) is 1 to 1.5.

2. A steel structure covered with a not less than 10 μm thick coating film containing organic resin on at least a part of one or both of steel or zinc-alloy coated surfaces, characterized in that said coating film containing organic resin contains atomized zinc-alloy powder at not less than 60 mass %, said powder contains aluminum at not less than 10 mass % and less than 30 mass %, at least one of magnesium at more than 0 mass % and less than 1 mass % and silicon at not less than 0.1 mass % and not more than 3.0% mass %, and the remainder comprising zinc and unavoidable impurities, wherein the atomized zinc-alloy powder has a 90% cumulative particle size not more than 35 μm and an average particle size of not less than 2 μm, and the shape of powder particles is spherical or oval and the ratio between the maximum and minimum diameters (maximum diameter/minimum diameter) is 1 to 1.5.

* * * * *